(12) United States Patent
Kudo (10) Patent No.: US 8,052,533 B2
(45) Date of Patent: Nov. 8, 2011

(54) GAME MACHINE, GAME MACHINE CONTROL METHOD, AND INFORMATION STORAGE MEDIUM

(75) Inventor: Shinichi Kudo, Hokkaido (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 886 days.

(21) Appl. No.: 12/066,794

(22) PCT Filed: Aug. 11, 2006

(86) PCT No.: PCT/JP2006/315950
§ 371 (c)(1),
(2), (4) Date: Mar. 13, 2008

(87) PCT Pub. No.: WO2007/032171
PCT Pub. Date: Mar. 22, 2007

(65) Prior Publication Data
US 2009/0270182 A1 Oct. 29, 2009

(30) Foreign Application Priority Data
Sep. 15, 2005 (JP) .................... 2005-269214

(51) Int. Cl.
*A63F 9/24* (2006.01)
(52) U.S. Cl. ........................... 463/43; 463/42
(58) Field of Classification Search .............. 463/42, 463/43
See application file for complete search history.

(56) References Cited

U.S. PATENT DOCUMENTS

| | | | | |
|---|---|---|---|---|
| 4,491,324 A | * | 1/1985 | Yoshida ........................... | 463/8 |
| 5,390,937 A | * | 2/1995 | Sakaguchi et al. ............... | 463/7 |
| 5,393,071 A | * | 2/1995 | Best ................................. | 463/35 |
| 6,168,524 B1 | * | 1/2001 | Aoki et al. ...................... | 463/31 |
| 6,273,814 B1 | * | 8/2001 | Komoto ........................... | 463/7 |
| 6,273,822 B1 | * | 8/2001 | Tanaka ............................. | 463/43 |
| 6,283,854 B1 | * | 9/2001 | Niwa ............................... | 463/7 |

(Continued)

FOREIGN PATENT DOCUMENTS

JP 06-277364 A 10/1994

(Continued)

OTHER PUBLICATIONS

Gensosuikoden IV Official Guide Complete Edition, Oct. 21, 2004, Konami Media Entertainment, Inc., Japan, pp. 56-57.

*Primary Examiner* — Peter DungBa Vo
*Assistant Examiner* — Jason Skaarup
(74) *Attorney, Agent, or Firm* — Sughrue Mion, PLLC (57) ABSTRACT

A game machine which can improve an interest of selection of an action type of a player character is provided. A line output controlling unit (82) sequentially outputs a plurality of line strings corresponding to line identification information selected by a line selection unit (76) in a given order and at a given timing. A player character action type selection receiving unit (84) receives selection of an action type of a player character in at least a period after the line output controlling unit (82) outputs. A parameter value updating unit (80) changes, according to a combination of a selected action type of the player character and an action type of the enemy character corresponding to the selected line identification information, a parameter value indicating a state of an enemy character by an amount based on a time of selection of the action type of the player character.

7 Claims, 8 Drawing Sheets

| LINE ID | ORDER | LINE STRING | ACTION TYPE |
|---|---|---|---|
| S001 | 1 | I'LL BEAT YOU TO THE GROUND. ARE YOU PREPARED? | ATTACK |
| | 2 | HOW ABOUT THIS FOR A START? | |
| S002 | 1 | I'LL PLAY. | ATTACK |
| S003 | 1 | IT'S MY TURN. | DEFENSE |
| | 2 | WELL, I'LL LET YOU MOVE FIRST. | |
| S004 | 1 | COME ON. | DEFENSE |
| S005 | 1 | I'LL WAIT AND SEE FIRST. | SPECIAL |
| | 2 | I'VE CHANGED MY MIND. I'LL FINISH YOU WITH ONE ATTACK. | |
| S006 | 1 | NO MORE FOOLING AROUND. | SPECIAL |

U.S. PATENT DOCUMENTS

| | | | |
|---|---|---|---|
| 6,375,571 B1* | 4/2002 | Ohnuma et al. | 463/37 |
| 6,540,614 B1* | 4/2003 | Nishino et al. | 463/40 |
| 6,614,435 B1* | 9/2003 | Tsujimoto | 345/473 |
| 6,669,562 B1* | 12/2003 | Shiino | 463/31 |
| 6,884,163 B2* | 4/2005 | Namba et al. | 463/1 |
| 2001/0005689 A1* | 6/2001 | Fujioka et al. | 463/4 |
| 2001/0008398 A1* | 7/2001 | Komata | 345/156 |
| 2002/0187837 A1* | 12/2002 | Hasebe et al. | 463/43 |
| 2003/0013529 A1* | 1/2003 | Miura et al. | 463/42 |
| 2004/0038739 A1* | 2/2004 | Wanat | 463/36 |
| 2004/0259636 A1* | 12/2004 | Machida | 463/30 |
| 2008/0194325 A1* | 8/2008 | Komuta | 463/31 |
| 2008/0211686 A1* | 9/2008 | Arai | 340/815.4 |

FOREIGN PATENT DOCUMENTS

| | | |
|---|---|---|
| JP | 2000-084253 A | 3/2000 |
| JP | 2001-162050 A | 6/2001 |
| JP | 2002-166045 A | 6/2002 |
| JP | 2002-189914 A | 7/2002 |
| JP | 2004-065571 A | 3/2004 |

* cited by examiner

| LINE ID | ORDER | LINE STRING | ACTION TYPE |
|---|---|---|---|
| S001 | 1 | I'LL BEAT YOU TO THE GROUND. ARE YOU PREPARED? | ATTACK |
| | 2 | HOW ABOUT THIS FOR A START? | |
| S002 | 1 | I'LL PLAY. | ATTACK |
| S003 | 1 | IT'S MY TURN. | DEFENSE |
| | 2 | WELL, I'LL LET YOU MOVE FIRST. | |
| S004 | 1 | COME ON. | DEFENSE |
| S005 | 1 | I'LL WAIT AND SEE FIRST. | SPECIAL |
| | 2 | I'VE CHANGED MY MIND. I'LL FINISH YOU WITH ONE ATTACK. | |
| S006 | 1 | NO MORE FOOLING AROUND. | SPECIAL |

GAME MACHINE, GAME MACHINE CONTROL METHOD, AND INFORMATION STORAGE MEDIUM

TECHNICAL FIELD

The present invention relates to a game machine, a game machine control method, and an information storage medium.

BACKGROUND ART

A game machine is known which executes a game in which a parameter value (for example, hit point) indicating a state of an enemy character is changed based on a combination of an action type of a player character selected by a player from among a plurality of action types of the player character and an action type of the enemy character selected from among a plurality of action types of the enemy character.
Patent Document 1: Japanese Patent Laid-Open Publication No. 2002-166045

DISCLOSURE OF THE INVENTION

Problems to be Solved by the Invention

In the above-described game, it is important as to how the player selects, as the action type of the player character, an action type of the player character which can change the parameter value indicating the enemy character. Therefore, if the interest in selecting the action type of the player character can be improved, the interest in the game can also be improved.

The present invention was conceived in consideration of the above-described circumstances, and an object of the present invention is to provide a game machine, a game machine control method, and an information storage medium in which an interest in selecting an action type of a player character can be improved in a game in which a parameter value indicating a state of an enemy character is changed based on a combination of an action type of a player character selected by a player from among a plurality of action types of the player character and an action type of the enemy character selected from among a plurality of action types of the enemy character.

Means for Solving the Problems

In order to achieve the above-described object, according to one aspect of the present invention, there is provided a game machine which executes a game in which a parameter value indicating a state of an enemy character is changed based on a combination of an action type of a player character selected by a player from among a plurality of action types of the player character and an action type of the enemy character selected from among a plurality of action types of the enemy character, the game machine comprising line storage means which stores one or a plurality of line strings in correspondence with each of a plurality of line identification information for identifying a line of the enemy character and which store a plurality of line strings in correspondence with at least one of the plurality of the line identification information; enemy character action type storage means which store one of the plurality of action types of the enemy character in correspondence with each of the plurality of line identification information; line selection means which selects one of the plurality of line identification information; line output controlling means which outputs one or a plurality of line strings corresponding to line identification information selected by the line selection means and which sequentially outputs, when a plurality of line strings correspond to the line identification information, the plurality of line strings in a given order and at a given timing; player character action type selection receiving means which receives selection of one of the plurality of action types of the player character by the player in at least a period after the line string is output by the line output controlling means; determination means which determines, when the player selects one of the plurality of action types of the player character, whether or not a combination of the action type of the player character and an action type of the enemy character corresponding to the line identification information selected by the line selection means is a predetermined combination; and parameter value updating means which changes, according to a determination result by the determination means, the parameter value indicating the state of the enemy character by an amount based on a timing of the selection of the action type of the player character by the player.

According to another aspect of the present invention, there is provided a method of controlling a game machine which executes a game in which a parameter value indicating a state of an enemy character is changed based on a combination of an action type of a player character selected by a player from among a plurality of action types of the player character and an action type of the enemy character selected from among a plurality of action types of the enemy character, the method comprising a step in which a stored content of line storage means which stores one or a plurality of line strings in correspondence with each of a plurality of line identification information for identifying a line of the enemy character and which stores a plurality of line strings in correspondence with at least one of the plurality of the line identification information is read; a step in which a stored content of enemy character action type storage means which stores one of the plurality of the action types of the enemy character in correspondence with each of the plurality of the line identification information is read; a line selection step in which one of the plurality of line identification information is selected; a line output controlling step in which one or a plurality of line strings corresponding to line identification information selected in the line selection step are output by output means and in which, when a plurality of line strings correspond to the line identification information, the plurality of line strings are sequentially output in a given order and at a given timing; a player character action type selection receiving step in which selection of one of the plurality of action types of the player character by the player is received in at least a period after the line string is output in the line output controlling step; a determination step in which it is determined, when the player selects one of the plurality of action types of the player character, whether or not a combination of the action type of the player character and an action type of the enemy character corresponding to the line identification information selected in the line selection step is a predetermined combination; and, according to a determination result in the determination step, a parameter value updating step in which the parameter value indicating the state of the enemy character is changed by an amount based on a timing of the selection of the action type of the player character by the player.

According to another aspect of the present invention, there is provided a program which causes a computer such as a home game machine, a portable game machine, a commercial game machine, a portable phone, a personal digital assistant (PDA), and a personal computer, to function as a game machine which executes a game in which a parameter value indicating a state of an enemy character is changed based on a combination of an action type of a player character selected by a player from among a plurality of action types of the player character and an action type of the enemy character selected from among a plurality of action types of the enemy character, the program causing the computer to function as line storage means which stores one or a plurality of line strings in correspondence to each of a plurality of line identification information for identifying a line of the enemy character and which stores a plurality of line strings in correspondence with at least one of the plurality of the line identification information; enemy character action type storage means which stores one of the plurality of action types of the enemy character in correspondence with each of the plurality of line identification information; line selection means which selects one of the plurality of line identification information; line output controlling means which outputs one or a plurality of line strings corresponding to line identification information selected by the line selection means and which sequentially output, when a plurality of line strings correspond to the line identification information, the plurality of line strings in a given order and at a given timing; player character action type selection receiving means which receives selection of one of the plurality of the action types of the player character by the player in at least a period after the line string is output by the line output controlling means; determination means which determines, when the player selects one of the plurality of action types of the player character, whether or not a combination of the action type of the player character and an action type of the enemy character corresponding to the line identification information selected by the line selection means is a predetermined combination; and parameter value updating means which changes, according to a determination result by the determination means, the parameter value indicating the state of the enemy character by an amount based on a timing of the selection of the action type of the player character by the player.

According to another aspect of the present invention, there is provided an information storage medium which is a computer readable information storage medium storing the program. According to another aspect of the present invention, there is provided a program distribution device comprising an information storage medium storing the program and which reads the program from the information storage medium and distributes the program. According to another aspect of the present invention, there is provided a program distribution method, while using an information storage medium storing the program, for reading the program from the information storage medium, and distributing the read program.

The present invention relates to a game machine which executes a game in which a parameter value indicating a state of an enemy character is changed based on a combination of an action type of a player character selected by a player from among a plurality of action types of the player character and an action type of the enemy character selected from among a plurality of action types of the enemy character. In the present invention, one or a plurality of line strings are stored in correspondence with each of a plurality of line identification information for identifying a line of the enemy character. For at least one of the plurality of line identification information, a plurality of line strings are stored in correspondence with each of the line identification information. In addition, one of the plurality of action types of the enemy character is stored in correspondence with each of the plurality of line identification information. One of the plurality of line identification information is selected and one or a plurality of line strings corresponding to the line identification information are output. When a plurality of line strings correspond to the line identification information, the plurality of line strings are sequentially output at a given timing. Moreover, in the present invention, selection of one of the plurality of action types of the player character by the player is received in at least a period after the line string is output. When the player selects one of the plurality of action types of the player character, it is determined whether or not a combination of the action type of the player character and an action type of the enemy character stored corresponding to the selected line identification information is a predetermined combination. The parameter value indicating the state of the enemy character is changed, according to a determination result, by an amount based on a timing of the selection from among the plurality of action types of the player character by the player. According to the present invention, in a game in which a parameter value indicating a state of an enemy character is changed based on a combination of an action type of a player character selected by a player from among a plurality of action types of the player character and an action type of the enemy character selected from among a plurality of action types of the enemy character, an interest in selecting the action type of the player character can be improved.

According to another aspect of the present invention, the parameter value updating means may comprise timer means which measures time from a given time to a time of selection of the action type of the player character by the player, and may change the parameter value indicating the state of the enemy character by an amount based on a time measurement result by the timer means.

BEST MODE FOR CARRYING OUT THE INVENTION

A preferred embodiment of the present invention will now be described in detail with reference to the drawings.

Figure 1:
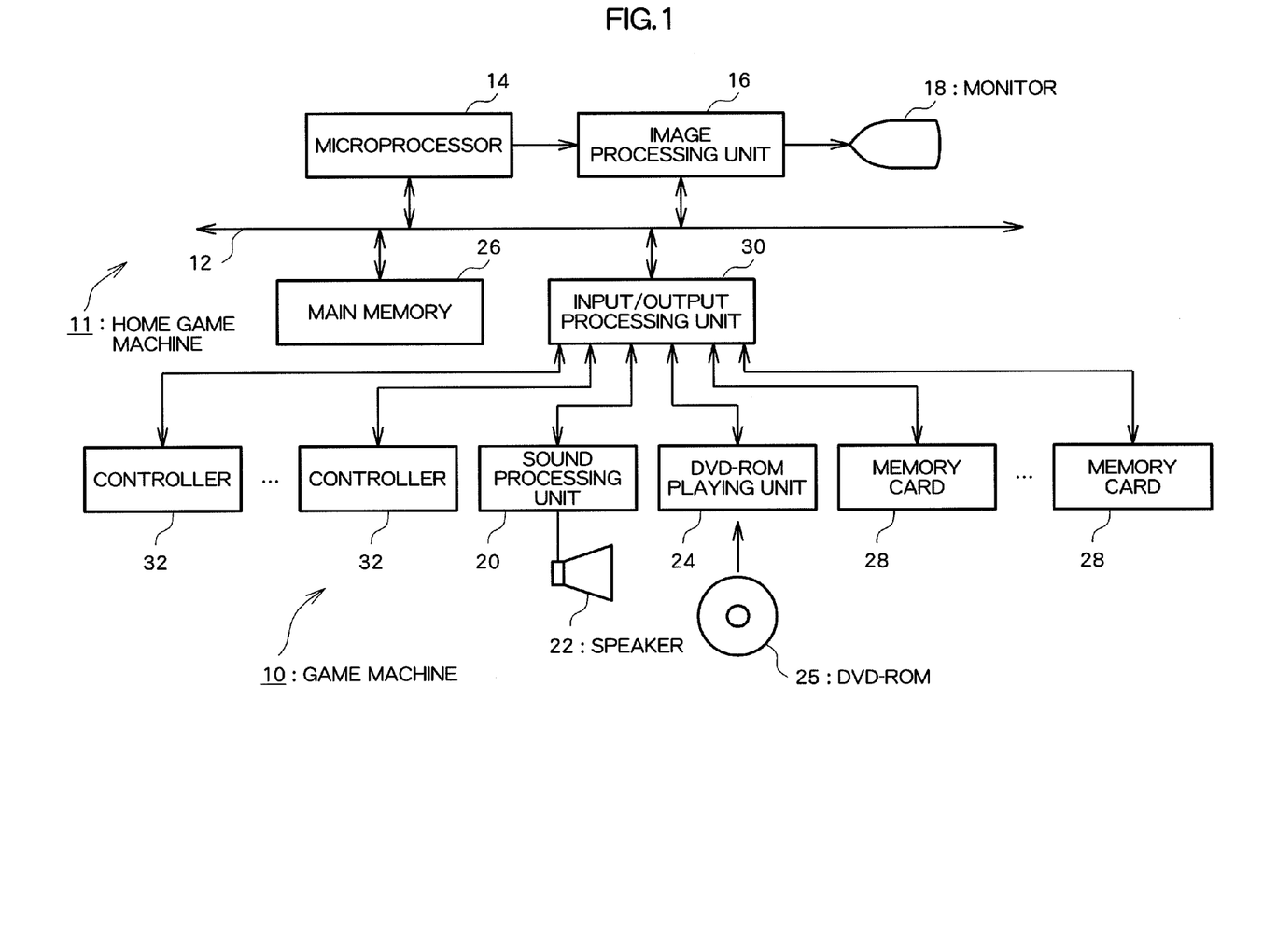
FIG. 1 is a diagram showing a hardware structure of a game machine according to a preferred embodiment of the present invention.

FIG. 1 is a diagram showing a structure of a game machine according to a preferred embodiment of the present invention. A game machine 10 shown in FIG. 1 is constructed by including a home game machine 11 with a DVD-ROM 25 and a memory card 28 which are information storage media, and connecting a monitor 18 and a speaker 22. For example, a home television receiver is used as the monitor 18 and a built-in speaker of the television receiver is used as the speaker 22.

The home game machine 11 is a known computer game system comprising a bus 12, a microprocessor 14, an image processing unit 16, a sound processing unit 20, a DVD-ROM playing unit 24, a main memory 26, an input/output processing unit 30, and a controller 32. The constituent elements other than the controller 32 are stored in a housing.

The bus 12 is provided for exchanging address and data between various sections of the home game machine 11. The microprocessor 14, image processing unit 16, main memory 26, and input/output processing unit 30 are connected by the bus 12 in a manner to enable mutual data communication.

The microprocessor 14 controls various sections of the home game machine 11 according to an operating system stored in a ROM (not shown), a program which is read from the DVD-ROM 25, and data which is read from the memory card 28. The main memory 26 comprises, for example, a RAM, and a program which is read from the DVD-ROM 25 and data which is read from the memory card 28 are written as necessary. The main memory 26 is also used as a working memory of the microprocessor 14.

The image processing unit 16 comprises a VRAM, and renders a game screen in the VRAM based on image data sent from the microprocessor 14. The contents of the rendered game screen are converted to a video signal and output to the monitor 18 at a predetermined timing.

The input/output processing unit 30 is an interface for the microprocessor 14 to access the sound processing unit 20, DVD-ROM playing unit 24, memory card 28, and controller 32. The sound processing unit 20, DVD-ROM playing unit 24, memory card 28, and controller 32 are connected to the input/output processing unit 30.

The sound processing unit 20 comprises a sound buffer. The sound processing unit 20 plays various sound data such as game music, sound effects of the game, messages, etc. which are read from the DVD-ROM 25 and stored in the sound buffer, and outputs from the speaker 22.

The DVD-ROM playing unit 24 reads a program stored on the DVD-ROM 25 according to an instruction from the microprocessor 14. Here, a configuration is described in which the DVD-ROM 25 is used for supplying the program to the home game machine 11, but alternatively, other various information storage media may be used, such as a CD-ROM, a ROM card, etc. Alternatively, the program may be supplied from a remote location via a data communication network such as the Internet to the home game machine 11.

The memory card 28 comprises a nonvolatile memory (such as, for example, EEPROM). The home game machine 11 has a plurality of memory card slots in which the memory card 28 can be equipped so that a plurality of memory cards 28 can be simultaneously equipped. The memory card 28 is formed to be detachable from the memory card slot, and is used, for example, for storing various game data such as save data.

The controller 32 is a general-purpose operation inputting device for the player to input various game operations. The input/output processing unit 30 periodically scans the state of various sections of the controller 32 at a predetermined period (for example, every 1/60 second), and sends an operation signal indicating the scan result via the bus 12 to the microprocessor 14. The microprocessor 14 determines the game operation of the player based on the operation signal. The home game machine 11 is configured so that a plurality of controllers 32 can be connected, and the microprocessor 14 controls the game based on operation signals which are input from the controllers 32.

Figure 2:
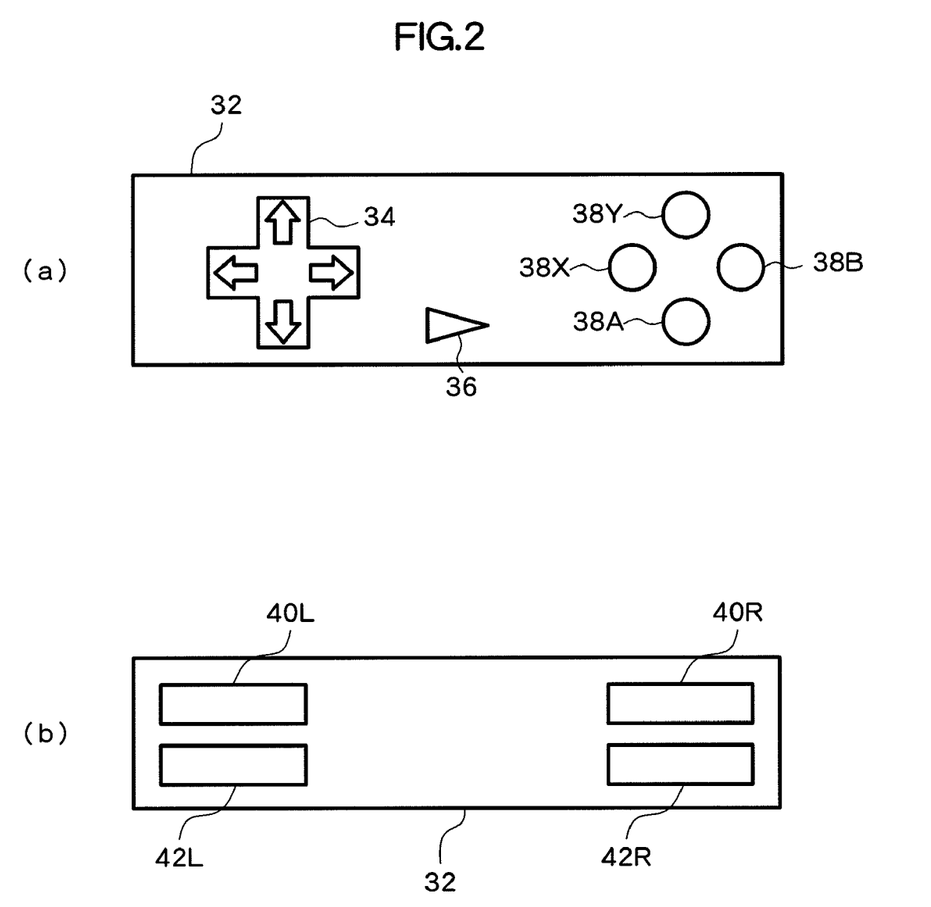
FIG. 2 is a diagram showing an example of a controller.

FIG. 2 is a diagram showing an example of the controller 32. The controller 32 shown in FIG. 2 is a general-purpose game controller. As shown in FIG. 2(*a*), a direction button 34, a start button 36, and buttons 38X, 38Y, 38A, and 38B are provided on a front surface of the controller 32. As shown in FIG. 2(*b*), on the back side surface of the controller 32, buttons 42L and 42R are provided on the left and right at a side near the front surface, and buttons 40L and 40R are provided on the left and right at a side near a rear surface. The direction button 34 has a shape of a cross and is normally used for setting a movement direction of a character or a cursor. The start button 36 is a small pressing button having a triangular shape and is normally used for starting a game or forcefully ending a game. The buttons 38X, 38Y, 38A, 38B, 40L, 40R, 42L, and 42R are used for other game operations.

In a game machine 10 having the structure as described above, a game is provided in which a player character which acts according to an action type selected by a player and an enemy character which acts according to an action type selected by the computer fight in a one-to-one duel.

Figure 3:
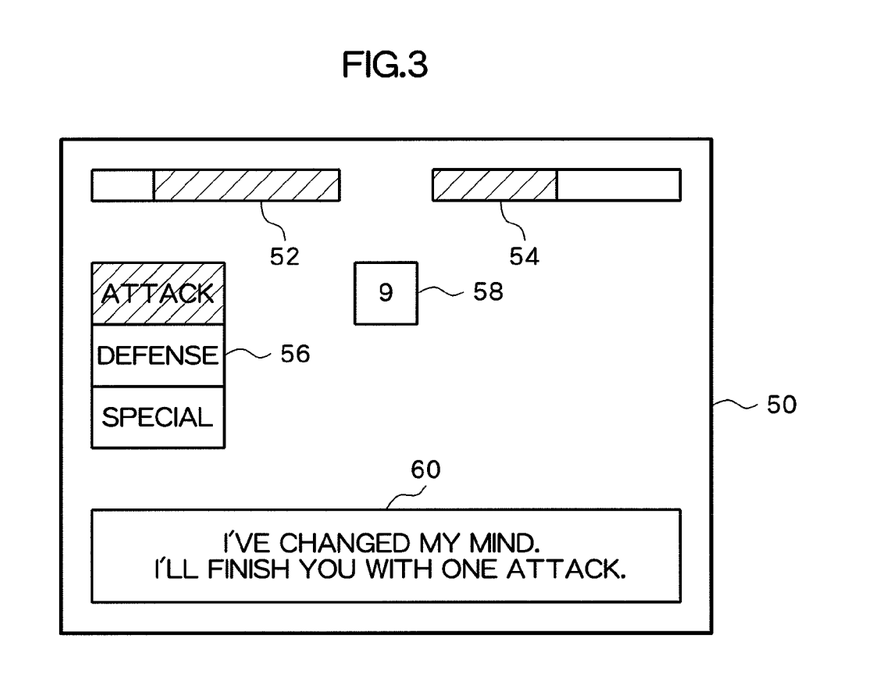
FIG. 3 is a diagram showing an example of a game screen.

FIG. 3 shows an example of a game screen (herein after referred to as a "duel screen") displayed on the monitor 18. As shown in FIG. 3, on a duel screen 50, gauge images 52 and 54, an action type selection guidance image 56, a time limit guidance image 58, and a line image 60 are displayed. On the duel screen 50, a situation of the player character and the enemy character facing each other, a situation of the player character and/or the enemy character attacking the opponent, etc. are displayed, but these displays will not be described here.

The gauge image 52 shows a remaining amount of hit point of the player character (a parameter value indicating a state of physical strength of the player character). When damage is inflicted on the player character, the gauge image 52 shrinks. When the hit point of the player character becomes 0 and the length of the gauge image 52 becomes 0, the player character loses. On the other hand, the gauge image 54 shows a remaining amount of hit point of the enemy character. When damage is inflicted on the enemy character, the gauge image 54 shrinks. When the hit point of the enemy character becomes 0 and the length of the gauge image 54 becomes 0, the player character wins.

The action type selection guidance image 56 is an image for guiding the player to select an action type of the player character. As shown in FIG. 3, in this game, as action types which can be instructed to the player character (action types of player character), "attack", "defense", and "special" are prepared. "Attack" is an action type for a normal attack. "Defense" is an action type for a defending position. "Special" is an action type for a special attack which is more forcible than the normal attack. The player operates the direction button 34 (a upward direction instructing section or a downward direction instructing section) to distinguishably display a region corresponding to a desired action type in the action type selection guidance image 56 and operates a decision button (for example, the button 38B) to decide the action type as the action type of the player character.

When an action type of the player character is selected, a situation of the player character and/or the enemy character causing damage to the opponent is displayed on the duel screen 50 according to a combination of the action type of the player character and an action type of the enemy character selected by the computer, and the hit point(s) of the player character and/or the enemy character is reduced. The action type of the enemy character is also selected from among the above-described "attack", "defense", and "special".

For example, when the combination of the action types of the player character and the enemy character is one of (attack, defense), (special, attack), and (defense, special), a situation of the player character inflicting damage on the enemy character is displayed on the duel screen 50 and the hit point of the enemy character is reduced. The combination of (attack, defense) indicates that the action type of the player character is "attack" and the action type of the enemy character is "defense".

When, on the other hand, the combination of the action types of the player character and the enemy character is one of (defense, attack), (attack, special), and (special, defense), a situation of the player character being damaged by the enemy character is displayed on the duel screen 50 and the hit point of the player character is reduced.

When, for example, the combination of the action types of the player character and the enemy character is (attack, attack), a situation in which the characters engage in a close contest and no damage is inflicted on either character is displayed on the duel screen 50. When, for example, the combination of the action types of the player character and the enemy character is (defense, defense), a situation in which both characters keep eyes on the opponent and no damage is inflicted on either character is displayed on the duel screen 50. When, for example, the combination of the action types of the player character and the enemy character is (special, special), a situation in which the characters hit each other and a damage is inflicted on both characters is displayed on the duel screen 50, and hit points of both the player character and the enemy character are reduced.

As described, in this game, because it is determined whether or not the player character inflicts damage on the enemy character based on the combination of the action types of the player character and the enemy character, the player must anticipate the action type of the enemy character and select, as the action type of the player character, an action type which results in the player character inflicting damage on the enemy character.

In this regard, the game is configured so that the enemy character speaks a line. In other words, as shown in FIG. 3, a line image 60 is displayed on the duel screen 50. The content of the line spoken by the enemy character corresponds to the action type of the enemy character. Because of this, the player can anticipate the action type of the enemy character relying on the line image 60, and select an action type of the player character.

In addition, a time limit is set for the selection of the action type of the player character, and a time limit guidance image 58 for indicating the remaining time until the time limit is displayed on the duel screen 50. In the present embodiment, if the time limit expires while the action type of the player character is not selected, it is assumed that "defense" is selected as the action type of the player character.

A technique for improving interest of selection of the action type of the player character in such a game will now be described.

Figure 4:
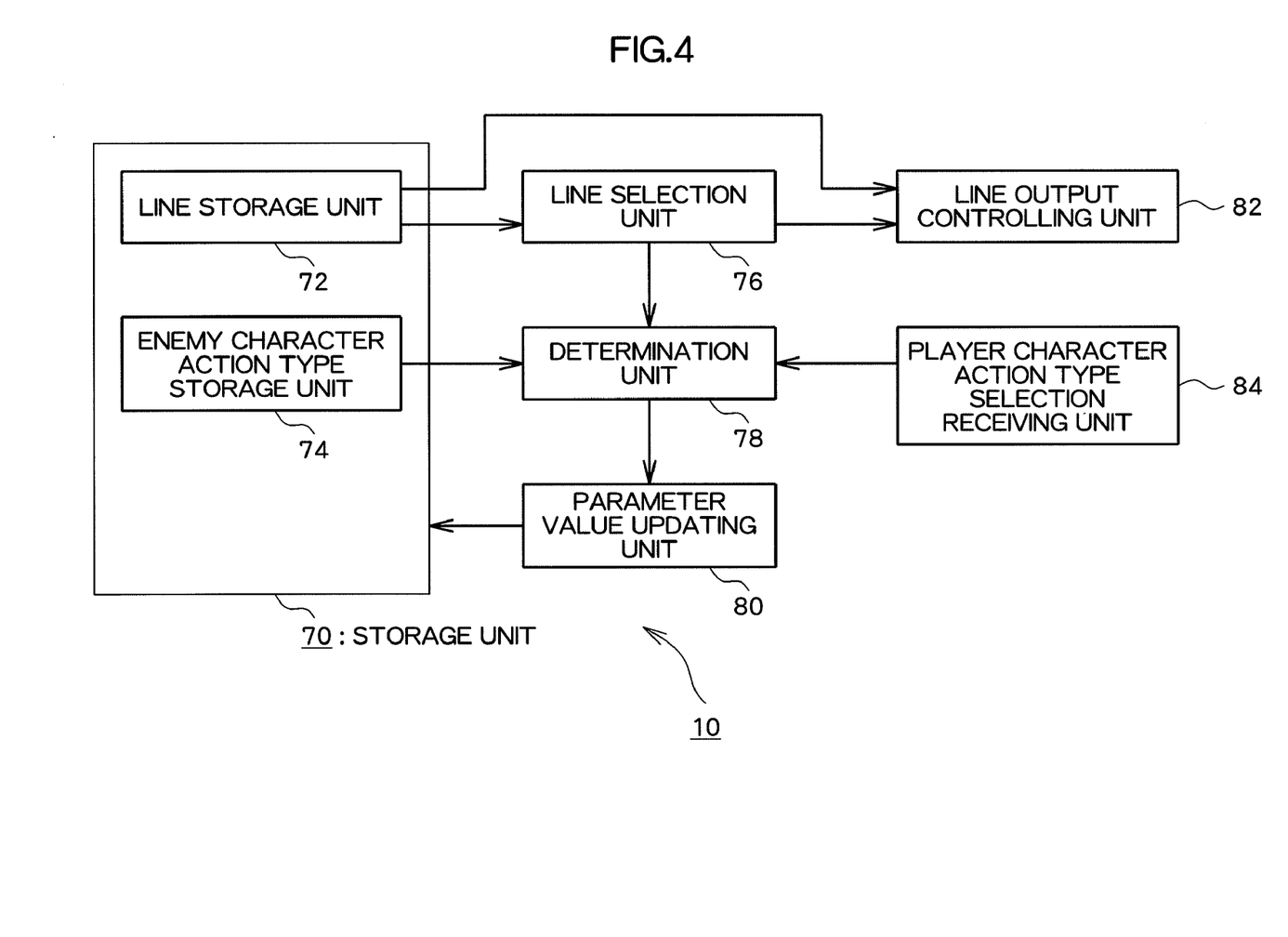
FIG. 4 is a diagram showing a functional block of a game machine according to a preferred embodiment of the present invention.

FIG. 4 is a functional block diagram mainly showing functions, among the functions realized in the game machine 10, related to the present invention. As shown in FIG. 4, the game machine 10 comprises functions of a storage unit 70, a line selection unit 76, a determination unit 78, a parameter value updating unit 80, a line output controlling unit 82, and a player character action type selection receiving unit 84. These functions are realized by the program which is read from the DVD-ROM 25 being executed by the microprocessor 14.

[1. Player Character Action Type Selection Receiving Unit]

The player character action type selection receiving unit 84 is realized mainly with the microprocessor 14. The player character action type selection receiving unit 84 receives a selection of an action type of a player character by a player; that is, a selection of one of a plurality of action types available for the player character. For example, the player character action type selection receiving unit 84 causes the action type selection guidance image 56 to be displayed on the duel screen 50, and determines which of the "attack", "defense", and "special" is selected based on an operation signal which is input from the controller 32.

[2. Storage Unit]

The storage unit 70 is realized mainly with the main memory 26 and the DVD-ROM 25. The storage unit 70 stores, for example, current values for the hit points of the player character and the enemy character. The hit point is a parameter value indicating states of remaining physical strength of the player character and the enemy character. When the hit point of the player character or the enemy character becomes 0, the character is beaten by the opponent.

[3. Line Storage and Enemy Character Action Type Storage]

The storage unit 70 comprises a line storage unit 72 and an enemy character action type storage unit 74. The line storage unit 72 stores one or a plurality of line strings in correspondence with each of a plurality of line identification information. The line identification information is identification information for identifying a line of an enemy character. In the line storage unit 72, a plurality of line strings are stored in correspondence with each of at least one line identification information among the plurality of line identification information. When a plurality of line strings correspond to the line identification information, this indicates that the line related to the line identification information comprises a plurality of parts. The enemy character action type storage unit 74 stores one of a plurality of action types available for the enemy character in correspondence with each of the plurality of line identification information.

Figure 5:
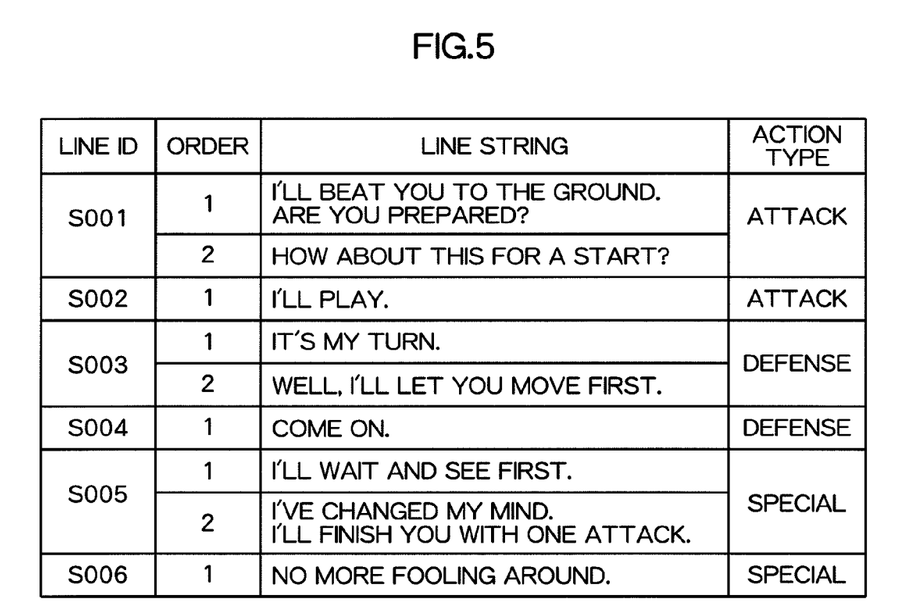
FIG. 5 is a diagram showing an example of a line table.

The line storage unit 72 and the enemy character action type storage unit 74 store a line table as shown in FIG. 5, for example. As shown in FIG. 5, the line table includes a "line ID" field, an "order" field, a "line string" field, and an "action type" field. The "line ID" field stores a line ID for uniquely identifying a line of the enemy character. The "order" field stores a numerical value showing an output order of the line string(s) corresponding to each line ID. The line strings corresponding to the line ID are successively output in the order from a smaller value to a larger value in the "order" field. The "action type" field stores information which specifies one of the "attack", "defense", and "special" as the action type of the enemy character.

In the present embodiment, when two line strings correspond to one line ID, a line string having a value of "1" in the "order" field has a content which suggests an action type which differs from the action type corresponding to the line ID. A line string having a value of "2" in the "order" field has a content which suggests an action type corresponding to the line ID. For example, while the "special" corresponds to the line ID "S005" as the action type of the enemy character, among the line strings corresponding to the line ID "S005", the line string corresponding to an order of "1" has a content which suggests the action type of "defense" and the line string corresponding to an order of "2" has a content which suggests the action type of "special".

[4. Line Selection Unit]

The line selection unit 76 is realized mainly with the microprocessor 14. The line selection unit 76 selects one of the plurality of line identification information which are stored in the line storage unit 72. In the present embodiment, the line selection unit 76 selects one of the line IDs stored in the "line ID" field of the line table based on a random number.

[5. Line Output Controlling Unit]

The line output controlling unit 82 is realized mainly with the microprocessor 14, image processing unit 16, and sound processing unit 20. The line output controlling unit 82 outputs (through, for example, display or sound output) one or a plurality of line strings corresponding to the line identification information selected by the line selection unit 76. The line output controlling unit 82 sequentially outputs, when a plurality of line strings correspond to the line identification information selected by the line selection unit 76, the plurality of line strings at a given timing.

In the present embodiment, the line output controlling unit 82 outputs, when a plurality of line strings correspond to the line ID selected by the line selection unit 76, the plurality of line strings in an order according to a value in the "order" field and at a time interval according to the number of line strings corresponding to the line ID.

The output of the line related to the line identification information selected by the line selection unit 76 (the first line string when a plurality of line strings correspond to the line identification information) and the period in which the reception by the player character action type selection receiving unit 84 is allowed, may be started at approximately the same time. Alternatively, the output of the line related to the line identification information selected by the line selection unit 76 (first line string when a plurality of line strings correspond to the line identification information) may be started after the period in which reception by the player character action type selection receiving unit 84 is allowed is started. Alternatively, the period in which the reception by the player character action type selection receiving unit 84 is allowed may be started after the output of the line related to the line identification information selected by the line selection unit 76 (first line string when a plurality of line strings correspond to the line identification information) is started.

[6. Determination Unit]

The determination unit 78 is realized mainly with the microprocessor 14. The determination unit 78 determines, when the player selects an action type of the player character from among a plurality of action types, whether or not a combination of the action type of the player character and an action type stored in the enemy character action type storage unit 74 in correspondence to the line identification information selected by the line selection unit 76 (the action type of the enemy character) is a predetermined combination.

[7. Parameter Value Updating Unit]

The parameter value updating unit 80 changes, according to a determination result by the determination unit 78, the parameter value indicating the state of the enemy character (for example, a parameter value indicating a state of a physical strength of the enemy character) by an amount based on a timing of selection of the action type of player character by the player. For example, the parameter value updating unit 80 comprises a timer unit which measures time from a given time to a time of selection of the action type of the player character by the player, and changes the parameter value indicating the state of the enemy character by an amount based on a time measurement result by the timer unit. The given time may be, for example, the start of the period in which the reception by the player character action type selection receiving unit 84 is allowed. Alternatively, for example, the given time is start of the output, by the line output controlling unit 82, of the line string corresponding to the line identification information selected by the line selection unit 76 (output of a first line string when a plurality of line strings correspond to the line identification information).

Figure 6:
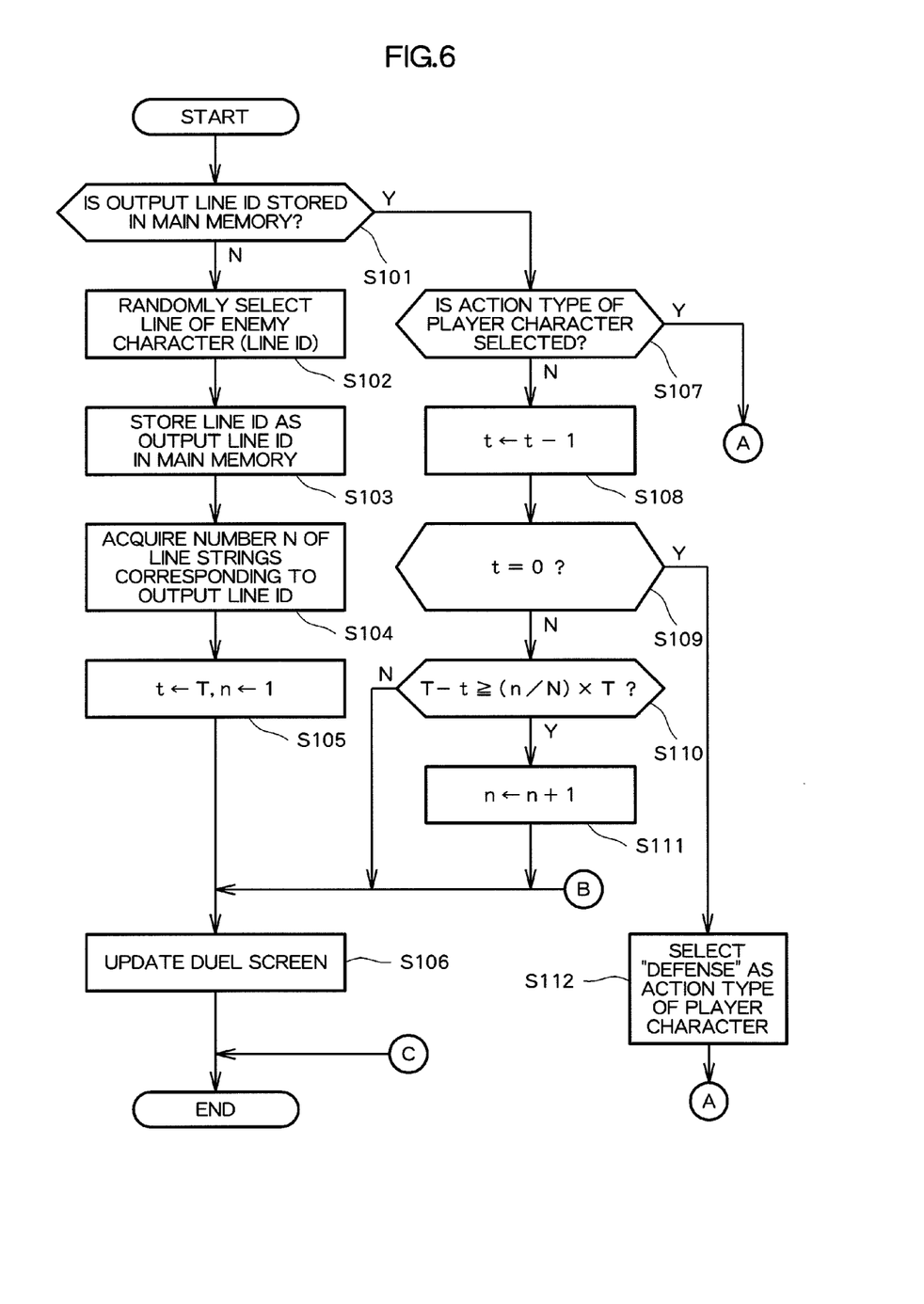
FIG. 6 is a flowchart showing a process executed by a game machine.
Figure 7:
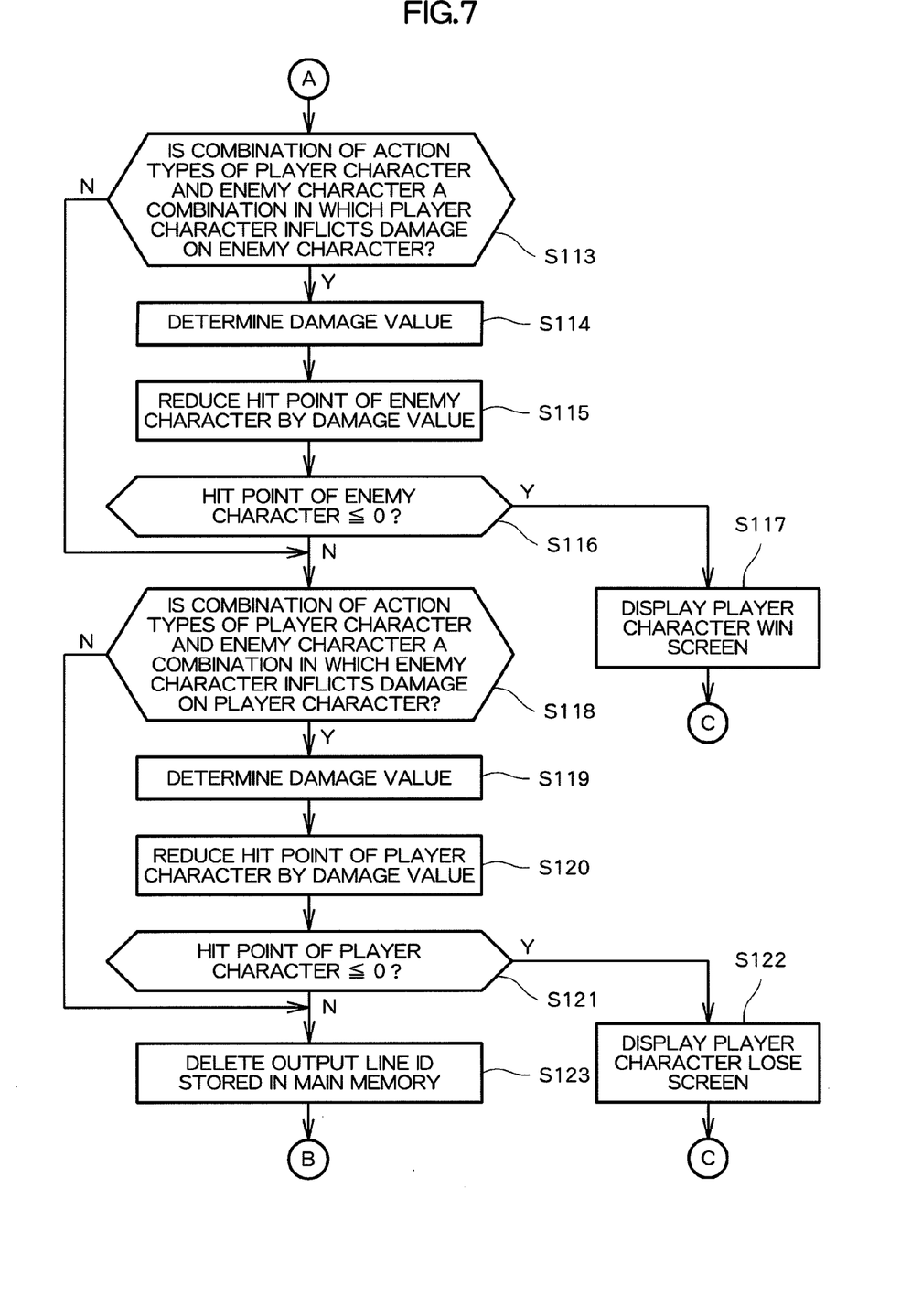
FIG. 7 is a flowchart showing a process executed by a game machine.

Next, a process executed by the game machine 10 will be described. FIGS. 6 and 7 show flowcharts of a process periodically executed at a predetermined interval (every ¹⁄₆₀ second in the present embodiment) after the duel screen 50 of an initial state is displayed, and until the one-to-one duel between the player character and the enemy character is decided. This process is executed by a program which is read from the DVD-ROM 25 and executed by the microprocessor 14. The "duel screen 50 of the initial state" refers to a duel screen 50 when the one-to-one duel between the player character and the enemy character is started. More specifically, the duel screen 50 of the initial state is a duel screen 50 in which the action type selection guidance image 56, the time limit guidance image 58, and the line image 60 are removed, and gauge images 52 and 54 are extended to maximum lengths compared to the duel screen 50 shown in FIG. 3.

As shown in FIG. 6, in this process, first it is determined whether or not an output line ID is stored in the main memory 26 (S101). In the present embodiment, when a line of the enemy character is selected in step S102 to be described later, the line ID related to the line is stored in the main memory 26 as an output line ID in step S103 to be described later. When the player selects an action type of the player character, the output line ID stored in the main memory 26 is deleted in step S123 to be described later.

When no output line ID is stored in the main memory 26, the line selection unit 76 randomly selects a line of the enemy character (S102). That is, the line selection unit 76 selects one of the line IDs stored in the line table (FIG. 5) based on a random number. In the present embodiment, because an active type of the enemy character uniquely corresponds to each line ID, the action type of the enemy character is randomly selected in this step.

Next, the line selection unit 76 stores the line ID as an output line ID in the main memory 26 (S103) and acquires a number N of the line strings corresponding to the line ID (S104). Then, a value of a variable t is initialized to T and a value of a variable n is initialized to 1 (S105). Here, the number T is a predetermined constant indicating the time limit of the selection of the action type of the player character in units of ¹⁄₆₀ second.

Next, the duel screen 50 is updated (S106). When the output line ID is stored in the main memory 26, a line image 60 showing a "line string corresponding to the output line ID and having a value of the 'order' field equal to the value of the variable n" and the action type selection guidance image 56 are displayed on the duel screen 50. In other words, the line of the enemy character is output and the reception of the selection of the action type of the player character is started. A time limit guidance image 58 indicating a remaining time (in seconds) of the time limit calculated by dividing a value of the variable t by 60 is displayed on the duel screen 50.

When it is determined in S101 that the output line ID is stored in the main memory 26, the player character action type selection receiving unit 84 determines whether or not an action type of the player character is selected by the player (S107). When the action type of the player character is not selected, the player character action type selection receiving unit 84 decrements the value of the variable t (S108). Then, the player character action type selection receiving unit 84 determines whether or not the value of the variable t is 0 (S109). That is, it is determined whether or not the time limit for selection of the action type of the player character has expired. When the value of the variable t is not 0, the line output controlling unit 82 determines whether or not a value of (T-t) is greater than or equal to (n/N)*T (S110). Here, the value of (T-t) represents an elapsed time from the start of the reception of the selection of the action type of the player character. In other words, the value of (T-t) indicates an elapsed time from the start of the output of the line of the enemy character. When the line output controlling unit 82 determines that the value of (T-t) is greater than or equal to (n/N)*T, the line output controlling unit 82 increments a value of the variable n (S111).

Then, the duel screen 50 is updated (S106). As described above, when the output line ID is stored in the main memory 26, a line image 60 indicating a "line string corresponding to the output line ID and having a value of the 'order' field equal to the value of the variable n" is displayed on the duel screen 50. Because of this, when the value of the variable n is incremented, the line image 60 is updated. In addition, the value of the variable n is updated with elapse of a given time (T/N) (refer to S110 and S111). Therefore, in the present embodiment, when N (N>1) line strings correspond to the output line ID (when the line of the enemy character comprises N parts), for example, with elapse of each time period obtained by dividing the time limit of selection of the action type of the player character (T) equally by N, the line image 60 displayed on the duel screen 50 is changed. With this structure, for example, it is possible to set the content of the line of the enemy character which is displayed first to be a content to mislead the player into anticipating an action type which differs from the true action type of the enemy character, and set the content of the line to be displayed later to a content which leads to the player to correctly anticipate the true action type of the enemy character. With this process, it is possible to preferably display a situation in which the enemy character tricks the player character (player), and consequently, to improve the interest in selection of the action type of the player character.

When it is determined in S109 that the value of the variable t is 0, the player character action type selection receiving unit 84 assumes that "defense" is selected by the player as the action type of the player character (S112).

When it is determined in S107 that an action type of the player character is selected or when it is assumed in S112 that "defense" is selected as the action type of the player character, the determination unit 78 determines whether or not a combination of the action type of the player character selected by the player and the action type corresponding to the output line ID (action type of the enemy character) is one of combinations in which the player character inflicts damage on the enemy character ((special, attack), (attack, defense), (defense, special), and (special, special)) (S113).

When the combination of the action types is a combination in which the player character inflicts damage on the enemy character, the parameter value updating unit 80 determines a damage value (S114). In this case, when the combination of the action types is other than the combination of (special, special), the damage value is determined based on the value of the variable t. More specifically, the damage value is determined to be larger with a larger value of the variable t. In other words, the damage value is determined such that the damage value is increased as the remaining time of the time limit of the selection of the action type of the player character is increased. The parameter value updating unit 80 reduces the hit point of the enemy character by the amount of the damage value (S115). Then, it is determined whether or not the hit point of the enemy character is less than or equal to 0 (S116). When the hit point of the enemy character is less than or equal to 0, a player character win screen is displayed, and a situation is displayed in which the player character defeats the enemy character (S117).

When it is determined in S113 that the combination of the action types is not a combination in which the player character inflicts damage on the enemy character or when it is determined in S116 that the hit point of the enemy character is greater than 0, the determination unit 78 determines whether or not the combination of the action type of the player character selected by the player and the action type corresponding to the output line ID (action type of the enemy character) is one of the combinations in which the enemy character inflicts damage on the player character ((attack, special), (defense, attack), (special, defense), and (special, special)) (S118).

When the combination of the action types is a combination in which the enemy character inflicts damage on the player character, the parameter value updating unit 80 determines a damage value (S119). Then, the parameter value updating unit 80 reduces the hit point of the player character by an amount of the damage value (S120). Then, it is determined whether or not the hit point of the player character is less than or equal to 0 (S121), and when the hit point of the player character is less than or equal to 0, a player character lose screen is displayed, and a situation is displayed in which the player character is defeated by the enemy character (S122).

When it is determined in S118 that the combination of the action types is not a combination in which the enemy character inflicts damage on the player character, or it is determined in S121 that the hit point of the player character is greater than 0, the output line ID stored in the main memory 26 is deleted (S123).

Then, the duel screen 50 is updated (S106). In this case, the action type selection guidance image 56, time limit guidance image 58, and line image 60 are not displayed in the duel screen 50. The gauge images 52 and 54 are updated based on the values of the hit points of the player character and the enemy character, respectively. In addition, according to the combination of the action types of the player character and the enemy character, a situation, for example, of the player character inflicting damage on the enemy character is displayed on the duel screen 50.

In this manner, the game machine 10 provides a game in which a parameter value indicating a state of an enemy character is changed based on a combination of an action type of a player character selected by a player from among a plurality of action types and an action type of an enemy character selected from among a plurality of action types. In this game, because it is determined whether or not a player character inflicts damage on the enemy character based on a combination of action types of the player character and the enemy character, it is important for the player to anticipate the action type of the enemy character and select, as the action type of the player character, an action type in which the player character inflicts damage on the enemy character. In this regard, a line of the enemy character is displayed in the game. The line of the enemy character has a content which suggests an action type of the enemy character so that the player can select the action type of the player character using the line of the enemy character as a hint.

In particular, in this game, at least some of the lines of the enemy character comprise a plurality of parts, with the parts being displayed in a predetermined order and with a given time interval. In this case, the line of the part displayed at a relatively early stage has a content which suggests an action type which differs from the true action type of the enemy character and the line of the part displayed at a relatively late stage has a content which suggests a true action type of the enemy character. As a result, in this game, an interface which preferably displays a situation of the enemy character tricking the player character is realized as the interface for the player to select the action type of the player character. Because of this, in this game, the player must wait for all of the parts of the line of the enemy character to be displayed and select the action type of the player character in order to improve the precision of anticipation of the action type of the enemy character.

On the other hand, in this game, when the player character inflicts damage on the enemy character, the magnitude of the damage is larger as the selection of the action type of the player character becomes earlier. Because of this, the player must select the action type of the player character as early as possible in order to inflict greater damage on the enemy character.

As described, in the game machine 10, the player must delay the selection of the action type of the player character as much as possible in order to improve the precision of anticipation of the action type of the enemy character, but at the same time, must also select the action type of the player character as early as possible in order to inflict greater damage on the enemy character. With the game machine 10, in a game in which a parameter value indicating a state of an enemy character is changed based on a combination of an action type of a player character selected by a player from among a plurality of action types and an action type of the enemy character selected from among a plurality of action types, the interest for the player to select the action type of the player character can be improved. In other words, in the above-described game, the interface for the player to select the action type of the player character can be improved.

The present invention is not limited to the embodiment described above.

For example, the action types that can be selected as the action type of the player character (player character action types) may differ from the action types which can be selected as the action type of the enemy character (enemy character action types). For example, the action type of the player character may be selected from among "attack", "defense", and "special" while the action type of the enemy character may be selected from among "magic", "defense", and "special".

In this configuration also, similar to the above-described embodiment, concerning combination of the action types of the player character and the enemy character, (1) combinations in which damage is inflicted only on the enemy character (for example, (attack, defense)), (2) combinations in which damage is inflicted only on the player character (for example, (defense, magic)), (3) combinations in which no damage is inflicted on either the player character or the enemy character (for example, (attack, magic)), and (4) combinations in which damage is inflicted on both the player character and the enemy character (for example, (special, special)) may be stored. Then, it may be determined to which combination the combination of the action type of the player character selected by the player and the action type of the enemy character selected by the computer correspond, and a situation such as, for example, the player character inflicting damage on the enemy character may be displayed on the duel screen 50 according to the determination result.

Figure 8:
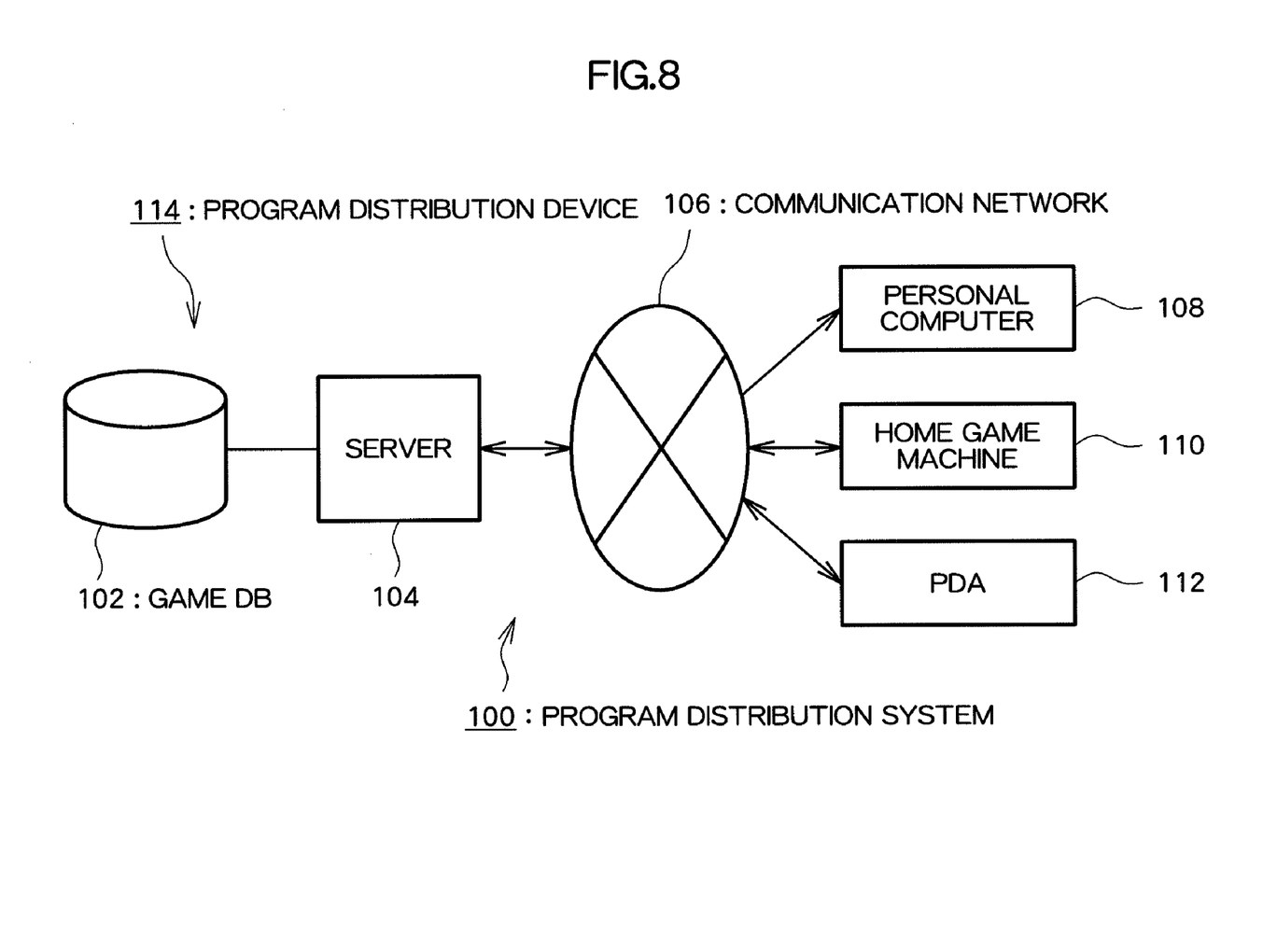
FIG. 8 is a diagram showing an overall structure of a program distribution system according to another preferred embodiment of the present invention.

In the above description, a program is supplied from the DVD-ROM 25 which is an information storage medium to the home game machine 11. Alternatively, the program may be distributed via a communication network to households. FIG. 8 is a diagram showing an overall structure of a program distribution system using a communication network. A program distribution method according to the present invention will now be described with reference to FIG. 8. As shown in FIG. 8, the program distribution system 100 comprises a game database 102, a server 104, a communication network 106, a personal computer 108, a home game machine 110, and a PDA (Personal Digital Assistant) 112. Of these, the game database 102 and the server 104 form a program distribution device 114. The communication network 106 includes, for example, the Internet or the cable television network. In this system, a program similar to the recorded content of the DVD-ROM 25 is stored in the game database (information storage medium) 102. When a demander requests distribution of a game using the personal computer 108, the home game machine 110, or the PDA 112, the request is sent via the communication network 106 to the server 104. The server 104 reads the program from the game database 102 in response to the game distribution request, and sends the program to the origin of the game distribution request such as the personal computer 108, the home game machine 110, or the PDA 112. Here, a configuration is employed in which the game is distributed in response to the game distribution request, but alternatively, a configuration may be employed in which the game is distributed one-sidedly from the server 104. In addition, not all programs necessary for realizing the game need to be distributed at once (package distribution), and the necessary portion may be distributed according to the phase of the game (split distribution). By distributing the game via the communication network 106, it is possible for the demander to easily obtain the program.

The invention claimed is:

1. A game machine which executes a game in which a parameter value indicating a state of an enemy character is changed based on a combination of an action type of a player character selected by a player from among a plurality of action types of the player character and an action type of the enemy character selected from among a plurality of action types of the enemy character, the game machine comprising:

line storage means which stores a plurality of line strings comprising first line strings suggesting a first action of the enemy character and second line strings suggesting a second action of the enemy character different from the first action of the enemy character, each of the plurality of line strings in relationship with one of a plurality of line identification information and one of the plurality of action types of the enemy character, the second action being different from the one of the plurality of action types of the enemy character in relationship with the line identification information and the first line strings of the plurality of strings, wherein the plurality of line identification information identifies a line of the enemy character;

enemy character action type storage means which stores one of the plurality of action types of the enemy character in correspondence with each of the plurality of line identification information;

line selection means which selects one of the plurality of line identification information;

line output controlling means which outputs one or a plurality of line strings corresponding to line identification information selected by the line selection means and which sequentially outputs, when a plurality of line strings correspond to the line identification information, the plurality of line strings in a given order and at a given timing;

player character action type selection receiving means which receives selection of one of the plurality of action types of the player character by the player in at least a period after the line string is output by the line output controlling means;

determination means which determines, when the player selects one of the plurality of action types of the player character, whether or not a combination of the action type of the player character and an action type of the enemy character corresponding to the line identification information selected by the line selection means is a predetermined combination; and parameter value updating means which changes, according to a determination result by the determination means, the parameter value indicating the state of the enemy character by an amount based on a timing of the selection of the action type of the player character by the player.

2. The game machine according to claim 1, wherein the parameter value updating means comprises timer means which measures time from a given time to a time of selection of the action type of the player character by the player, and changes the parameter value indicating the state of the enemy character by an amount based on a time measurement result by the timer means.

3. A method of controlling a game machine which executes a game in which a parameter value indicating a state of an enemy character is changed based on a combination of an action type of a player character selected by a player from among a plurality of action types of the player character and an action type of the enemy character selected from among a plurality of action types of the enemy character, the game machine including a processor which causes the game machine to perform the following steps:

a step in which a stored content of a line storage means which stores a plurality of line strings comprising first line strings suggesting a first action of the enemy character and second line strings suggesting a second action of the enemy character different from the first action of the enemy character, each of the plurality of line strings in relationship with one of a plurality of line identification information and one of the plurality of action types of the enemy character, the second action being different from the one of the plurality of action types of the enemy character in relationship with the line identification information and the first line strings of the plurality of strings, wherein the one or a plurality of line strings in correspondence with each of a plurality of line identification information identifies for identifying a line of the enemy character;

a step in which a stored content of enemy character action type storage means which stores one of the plurality of action types of the enemy character in correspondence with each of the plurality of the line identification information is read;

a line selection step in which one of the plurality of line identification information is selected;

a line output controlling step in which one or a plurality of line strings corresponding to line identification information selected in the line selection step are output by output means and in which, when a plurality of line strings correspond to the line identification information, the plurality of the line strings are sequentially output in a given order and at a given timing;

a player character action type selection receiving step in which selection of one of the plurality of the action types of the player character by the player is received in at least a period after the line string is output in the line output controlling step;

a determination step in which it is determined, when the player selects one of the plurality of action types of the player character, whether or not a combination of the action type of the player character and an action type of the enemy character corresponding to the line identification information selected in the line selection step is a predetermined combination; and a parameter value updating step in which the parameter value indicating the state of the enemy character is changed, according to a determination result in the determination step, by an amount based on a time of selection of the action type of the player character by the player.

4. A non-transitory computer-readable information storage medium storing a program which causes a computer to function as a game machine which executes a game in which a parameter value indicating a state of an enemy character is changed based on a combination of an action type of a player character selected by a player from among a plurality of action types of the player character and an action type of the enemy character selected from among a plurality of action types of the enemy character, the program causing the computer to function as:

line storage means which stores a plurality of line strings comprising first line strings suggesting a first action of the enemy character and second line strings suggesting a second action of the enemy character different from the first action of the enemy character, each of the plurality of line strings in relationship with one of a plurality of line identification information and one of the plurality of action types of the enemy character, the second action being different from the one of the plurality of action types of the enemy character in relationship with the line identification information and the first line strings of the plurality of strings, wherein the plurality of line identification information identifies a line of the enemy character;

enemy character action type storage means which stores one of the plurality of action types of the enemy character in correspondence with each of the plurality of the line identification information;

line selection means which selects one of the plurality of line identification information;

line output controlling means which outputs one or a plurality of line strings corresponding to line identification information selected by the line selection means and which sequentially outputs, when a plurality of line strings correspond to the line identification information, the plurality of the line strings in a given order and at a given timing;

player character action type selection receiving means which receives selection of one of the plurality of action types of the player character by the player in at least a period after the line string is output by the line output controlling means;

determination means which determines, when the player selects one of the plurality of action types of the player character, whether or not a combination of the action type of the player character and an action type of the enemy character corresponding to the line identification information selected by the line selection means is a predetermined combination; and parameter value updating means which changes, according to a determination result by the determination means, the parameter value indicating the state of the enemy character by an amount based on a time of selection of the action type of the player character by the player.

5. The game machine of claim 1, wherein the sequentially outputting the one or the plurality of the line strings in the given order at the given timing comprises outputting one of the first line strings based on whether an elapsed time for the player to select the action type of the player character is greater than or equal to a current line string number divided by a maximum line string number for the one of the plurality of line identification information, multiplied by a time period for the player to select the action type of the player character.

6. The method of claim 3, wherein the sequentially outputting the one or the plurality of the line strings in the given order at the given timing comprises outputting one of the first line strings based on whether an elapsed time for the player to select the action type of the player character is greater than or equal to a current line string number divided by a maximum line string number for the one of the plurality of line identification information, multiplied by a time period for the player to select the action type of the player character.

7. The non-statutory computer-readable medium of claim 4, wherein the sequentially outputting the one or the plurality of the line strings in the given order at the given timing comprises outputting one of the first line strings based on whether an elapsed time for the player to select the action type of the player character is greater than or equal to a current line string number divided by a maximum line string number for the one of the plurality of line identification information, multiplied by a time period for the player to select the action type of the player character.

* * * * *